United States Patent [19]
Pospisil et al.

[11] Patent Number: 5,570,611
[45] Date of Patent: Nov. 5, 1996

[54] CORE TERMINAL FOR MOTION-TRANSMITTING REMOTE CONTROL ASSEMBLY

[75] Inventors: Joseph Pospisil, Royal Oak; David Malone, Lapeer, both of Mich.

[73] Assignee: Teleflex, Inc., Plymouth Meeting, Pa.

[21] Appl. No.: 501,705

[22] Filed: Jul. 12, 1995

[51] Int. Cl.⁶ ...................................................... F16C 1/10
[52] U.S. Cl. ............................................................ 74/502.6
[58] Field of Search ................................. 74/502.6, 502.4

[56] References Cited

U.S. PATENT DOCUMENTS

| | | | |
|---|---|---|---|
| 4,304,148 | 12/1981 | Hamman | 74/502.4 |
| 4,304,149 | 12/1981 | Heimann | 74/502.4 |
| 4,364,284 | 12/1982 | Tani et al. | |
| 4,534,239 | 8/1985 | Heimann | 74/502.4 |
| 4,738,155 | 4/1988 | Stocker | |

*Primary Examiner*—Charles A. Marmor
*Assistant Examiner*—Mary Ann Battista
*Attorney, Agent, or Firm*—Howard & Howard

[57] ABSTRACT

A motion-transmitting remote control assembly of the type for transmitting motion along a curved path by a flexible motion-transmitting core element (12) movably supported in a conduit (14) with a slug (20) secured to a first end of the core element and a terminal for transferring forces between the core element and a control member (24), such as a brake actuator, and a method of fabricating the assembly. The terminal includes a connector (26) for connection to the control member (24), an abrasion-resistant sleeve (48) in sliding engagement with the core element (12) and for abutting engagement with the slug, and a vibration isolating member (30) supporting the sleeve (48) within the connector (26) to transmit forces from the slug (20) to the sleeve (48) and through the vibration member (30) and through the connector (26) to the control member while dampening vibrations between the core element and the control member. The method comprises the steps of: fabricating the connector (26) with an annular ring (36), fabricating the vibration isolating member (30) with a neck (40) for disposition in the ring (36) and a central bore (62) extending through the neck (40), fabricating an abrasion resistant sleeve (28) having an exterior larger than the bore (62) whereby the neck (40) of the vibration member may be inserted into the annular ring (36) and the abrasion sleeve (28) thereafter inserted into the bore (62) to radially expand the neck (40) into gripping engagement with the annular ring (36) to retain the assembly together.

19 Claims, 2 Drawing Sheets

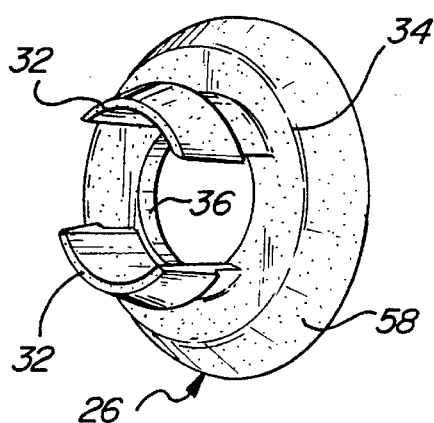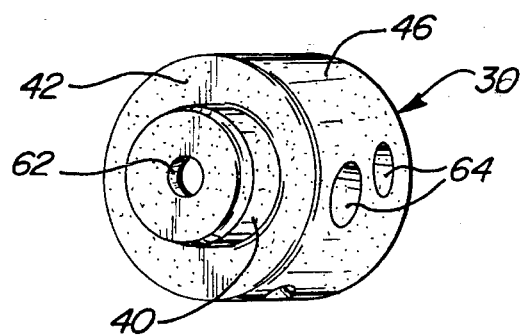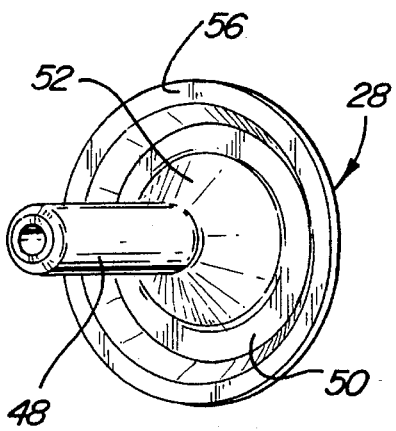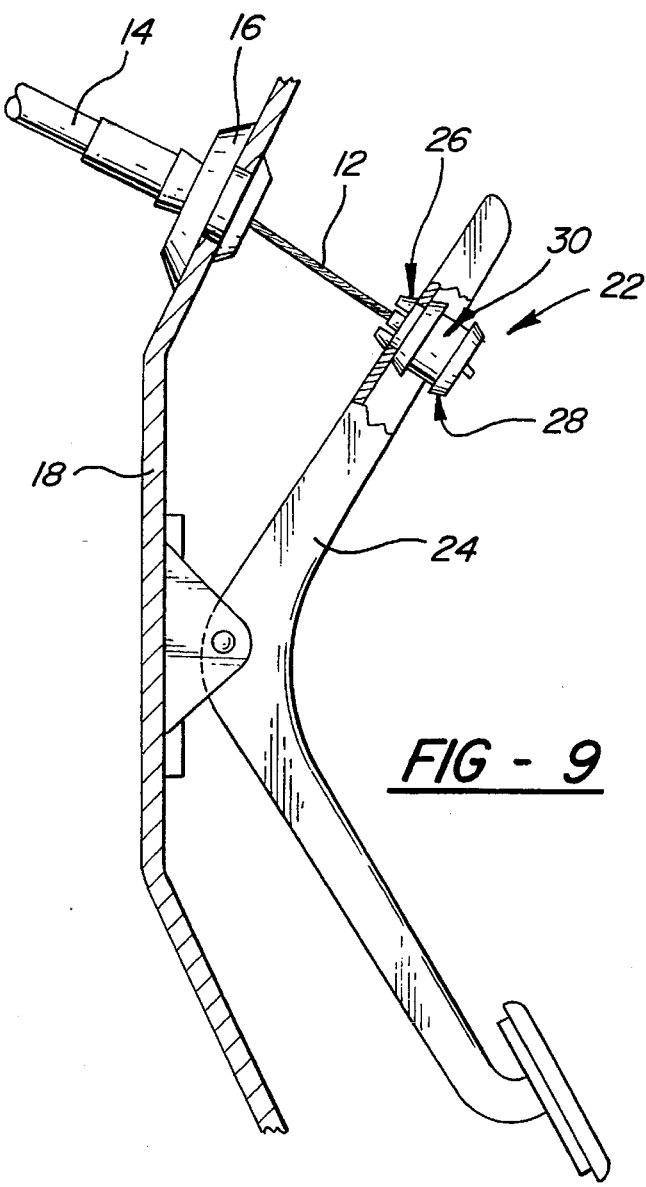

5,570,611

1

CORE TERMINAL FOR MOTION-TRANSMITTING REMOTE CONTROL ASSEMBLY

TECHNICAL FIELD

The subject invention relates to a motion-transmitting remote control assembly of the type for transmitting motion in a curved path by a flexible core element and, more specifically, to a terminal for transferring forces between the core element and a control member, such as a brake pedal actuator.

BACKGROUND ART

Automotive parking brake pedals are frequently connected to the brake system of the vehicle by a flexible motion-transmitting remote control assembly with the core element slidably supported in the conduit. The core element is attached at one end to the brake pedal and at the other end to the brake system. Terminal assemblies of this type are shown in U.S. Pat. Nos. 4,364,284 to Tani et al and 4,738,155 to Stocker. In some instances undesirable vibrations are transmitted between the core element and the brake pedal. Although terminals are known for isolating the core element from the control member as illustrated in U.S. Pat. No. 5,265,495 to Bung et al, none meet the specific criteria for a terminal axially slidable along the core element.

SUMMARY OF THE INVENTION

A motion-transmitting remote control assembly of the type for transmitting motion along a curved path by a flexible motion-transmitting core element having first and second ends extending from a conduit with a slug secured to the first end of the core element. The assembly is characterized by a terminal for transferring forces between the core element and a control member, such as a brake actuator, which terminal includes a connector for connection to the control member, an abrasion resistant member in sliding engagement with the core element and for abutting engagement with the slug, and a vibration isolating member supporting the abrasion member within the connector whereby forces may be transmitted axially from the slug to the abrasion member and through the vibration member and through the connector to the control member while dampening vibrations between the core element and the control member.

The invention also encompasses a method of fabricating such a motion-transmitting remote control assembly comprising the steps of: fabricating the connector with an annular ring, fabricating the vibration isolating member with a neck for disposition in the ring and a central bore extending through the neck, fabricating an abrasion resistant sleeve having an exterior larger than the bore whereby the neck of the vibration member may be inserted into the annular ring and the sleeve thereafter inserted into the bore to radially expand the neck into gripping engagement with the annular ring to retain the assembly together.

BRIEF DESCRIPTION OF THE DRAWINGS

Other advantages of the present invention will become readily appreciated as the same becomes better understood by reference to the following detailed description when considered in connection with the accompanying drawings wherein:

FIG. 6 is a perspective view of the connector member of the assembly;

FIG. 7 is a perspective view of the vibration isolation member of the assembly;

FIG. 8 is a perspective view of the abrasion resistant sleeve member; and

FIG. 9 is an environmental side view partially broken away and in cross-section of the terminal assembly of the subject invention connecting a core element to a parking brake pedal.

DETAILED DESCRIPTION OF PREFERRED EMBODIMENT

Figure 1:
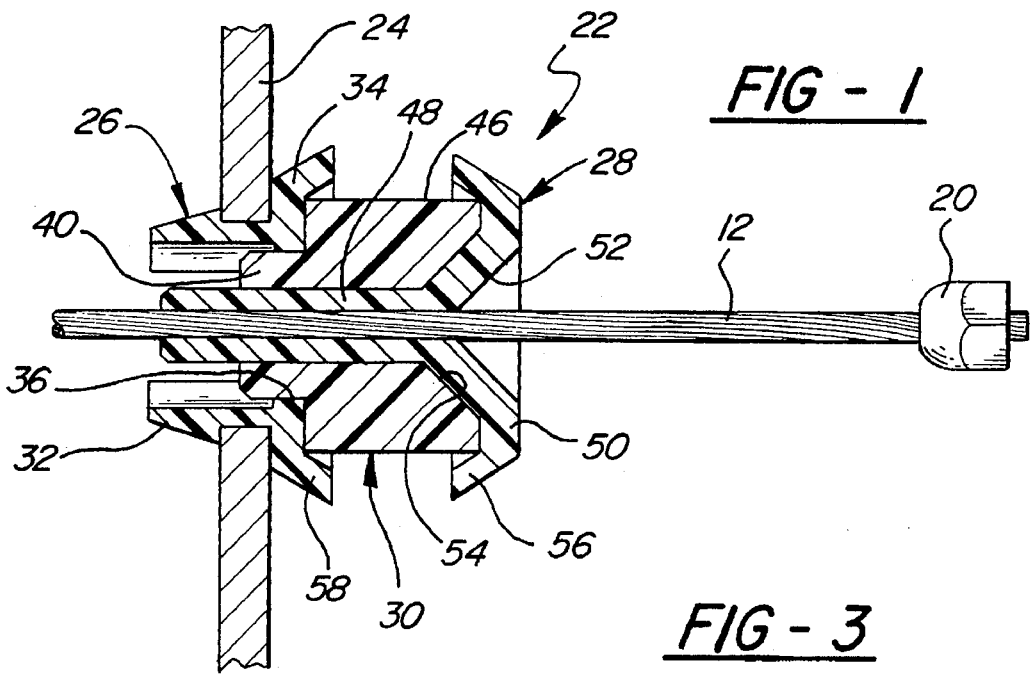
FIG. 1 a cross-sectional view of a preferred embodiment of the subject invention.
Figure 2:
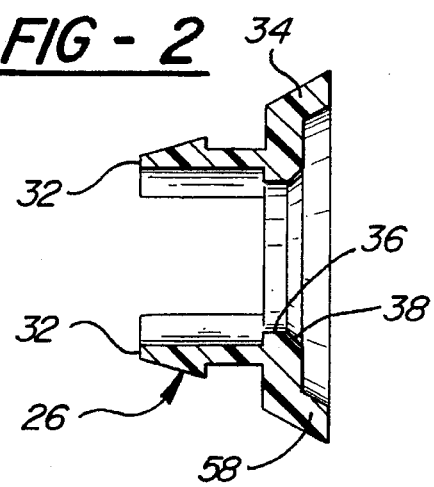
FIG. 2 is a cross-sectional view of the connector member of the assembly.
Figure 3:
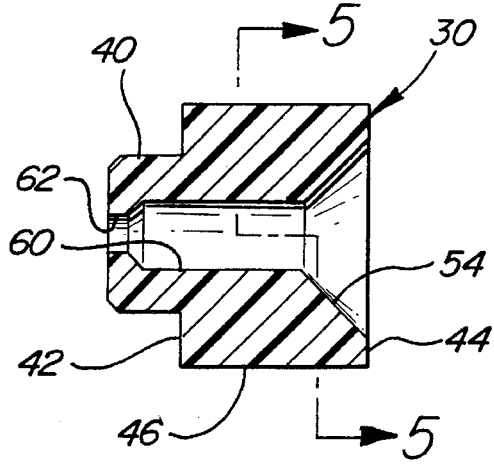
FIG. 3 is a cross-sectional view of the vibration isolation member of the assembly.
Figure 4:
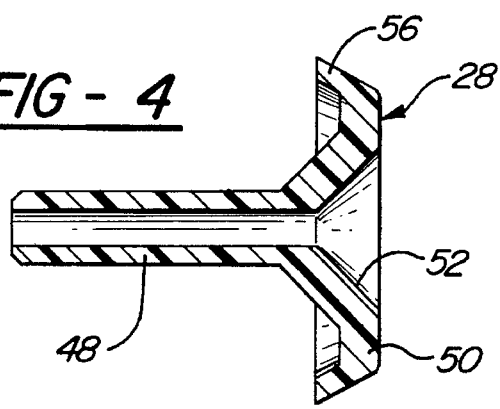
FIG. 4 is a cross-sectional view of the abrasion resistant sleeve member of the assembly.
Figure 5:
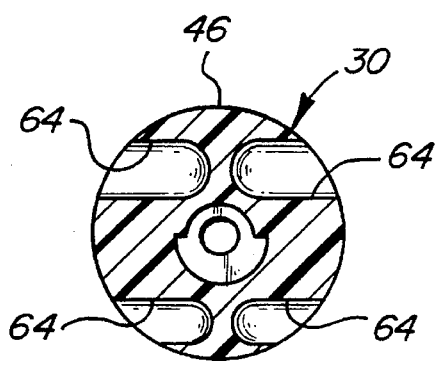
FIG. 5 is a cross-sectional view taken along line 5—5 of FIG. 3.

A motion-transmitting remote control assembly of the type for transmitting motion along a curved path by a flexible motion-transmitting core element 12. The core element 12 may be a wire or stranded cable as illustrated. The core element 12 has first and second ends and is slidably disposed in a conduit 14. The conduit 14 includes a support fitting 16 for supporting the conduit in a bulkhead 18, such as a floorboard of an automobile. The conduit may be of the well known type having an inner tubular member surrounded by long lay wires with an outer casing extruded about the long lay wires.

The first end of the core element 12 extends from the conduit 14 at the bulkhead 18 and a slug 20 is secured to that first end.

The assembly is characterized by a terminal, generally shown at 22, for transferring forces between the core element and a control member, such as the brake pedal actuator 24. The terminal 22 includes a connector, generally indicated at 26, for connection to the control member, an abrasion resistant member, generally indicated at 28, in sliding engagement with the core element 12 and for abutting engagement with the slug 20, a vibration isolating member, generally indicated at 30, supporting the abrasion member 28 within the connector 26 whereby forces may be transmitted axially from the slug 20 to the abrasion member 28 and through the vibration member 30 and through the connector 26 to the brake pedal control member 24 while dampening vibrations between the core element 12 and the brake pedal control member 24.

The connector 26 includes a snap-in portion 32 comprising a pair of opposing ears spaced diametrically from one another and defining a groove for insertion into and retention in an aperture in the brake peal member 24. The connector also includes a cup-shaped flange 34 extending radially from the snap-in portion 32. The connector 26 includes an annular ring 36 axially aligned with the flange 34, with a beveled edge 38.

The vibration isolating member 30 includes a neck 40 disposed in the ring 36. The beveled edge 38 guides the insertion of the neck 40 into the ring 36. The vibration member 30 also includes an inner end 42 and an outer end 44 with a cylindrical outer surface 46 extending therebetween. The neck 40 extends axially from the inner end 42.

The abrasion resistant member 28 includes a tubular sleeve 48 extending axially along and about the core element 12, and a head 50 extending radially from the sleeve 48 for engaging the slug 20. The head extends radially from said sleeve to abut said outer end of said vibration member. The head 50 extends radially from the sleeve 48 to abut the outer end 44 of the vibration member 30. The head 50 includes a conical section presenting a recess 52 surrounding the core element 12 for receiving the slug 20. The outer end 44 of the vibration member 30 includes a conical recess 54 for receiving the conical section 52 of the head 50. The head 50 includes a cup-shaped outer rim 56 surrounding the outer end 44 of the vibration member 30. The inner end 42 of the vibration member 30 presents a shoulder radially engaging the connector 26 about the neck 40 and the connector 26 presents a cup-shaped flange 58 surrounding the inner end 42 of the vibration member 30, the flange 58 and the rim 56 being flared outwardly over and in spaced relationship to the outer cylindrical surface 46 of the vibration member 30.

Accordingly, the connector 26 includes an annular ring 36 extending annularly about the vibration isolating member 30 and the vibration isolating member 30 includes a neck 40 disposed in the ring 36. The tubular sleeve 48 extends through the neck 40 of the vibration isolating member 30 and forces the neck 40 of the vibration isolating member 30 radially outwardly into compressive engagement with the ring 36 of the connector 26. The vibration isolating member 30 is softer than said abrasion resistant member 28 whereby the abrasion member 28 protects the softer vibration member from the wear and tear of the core element 12 and slug 20.

The invention also encompasses a method of fabricating such a motion-transmitting remote control assembly comprising the steps of fabricating the connector 26 with an annular ring 36, fabricating the vibration isolating member 30 with a neck 40 for disposition in the ring 36 and a central bore 62 extending through the neck 40, fabricating an abrasion resistant sleeve 48 having an exterior larger than the bore 62 whereby the neck 40 of the vibration member 30 may be inserted into the annular ring 36 and the sleeve 48 thereafter inserted into the bore 62 to radially expand the neck 40 into gripping engagement with the annular ring 36 to retain the assembly together. More specifically, the bore within the neck 40 of the vibration member 30 with a reduced cross-section 62 from the remainder 60 of the bore which is close in size to the exterior of the sleeve 48.

The method is further defined as fabricating the outer end 44 of the vibration member 30 with a conical recess 54 and fabricating the sleeve 48 with a head 50 having a conical section 52 for receiving the slug 20 and disposition in the conical recess 54 of the vibration member 30.

The method is further defined as fabricating the head 50 of the sleeve with a cup-shaped rim 56 flared outwardly from the outer end 44 of the vibration member 30, and fabricating the connector 26 with a flange 58 flared outwardly from the inner end 42 of the vibration member 30.

In operation, the neck 40 of the vibration member 30 is inserted into the ring 36 of the connector 26, such insertion being facilitated by the beveled corner 38 and a beveled or rounded corner on the leading edge of the neck 40. Thereafter, the sleeve 48 is forced into the bore 60 of the vibration member 30 where it fits snugly into the large portion 60 until it hits the reduced diameter 62. When the sleeve 48 engages the small cross section 62 of the bore 60, the sleeve expands the neck 46 to compress it about the ring 36 to frictionally retain the assembly together. As the assembly is placed in compression axially by tension upon the core element 12, the vibration member 30 bulges into a barrel shape, which is accommodated by the outwardly flared rim 56 and flange 58. This compression is also accommodated by cavities 64 in the vibration member 30.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A motion-transmitting remote control assembly of the type for transmitting motion along a curved path by a flexible motion-transmitting core element, said assembly comprising:

a conduit (14);

a core element (12) having first and second ends;

a slug (20) secured to said first end of said core element (12); and characterized by a terminal for transferring forces between said core element (12) and a control member (24), said terminal including a connector (26) for connection to the control member, an abrasion resistant member (28) in sliding engagement with said core element (12) and in abutting engagement with said slug (20), a vibration isolating member (30) supporting said abrasion resistant member (28) within said connector (26) for reacting axially in compression to transmit forces axially from said slug (20) to said abrasion resistant member (28) and through said vibration isolating member (30) and through said connector (26) to the control member (24) while dampening vibrations between said core element (12) and the control member (24).

2. An assembly as set forth in claim 1 wherein said abrasion resistant member (28) includes a tubular sleeve (48) extending axially along and about said core element (12) and a head (50) extending radially from said sleeve (48) for engaging said slug (20).

3. An assembly as set forth in claim 2 wherein said vibration isolating member (30) is softer than said abrasion resistant member (28).

4. A motion-transmitting remote control assembly of the type for transmitting motion along a curved path by a flexible motion-transmitting core element, said assembly comprising:

a conduit (14);

a core element (12) having first and second ends; a slug (20) secured to said first end of said core element (12); and characterized by a terminal for transferring forces between said core element (12) and a control member (24), said terminal including a connector (26) for connection to the control member, an abrasion resistant member (28) in sliding engagement with said core element (12) and in abutting engagement with said slug (20), a vibration isolating member (30) supporting said abrasion resistant member (28) within said connector (26) whereby forces may be transmitted axially from said slug (20) to said abrasion resistant member (28) and through said vibration isolating member (30) and through said connector (26) to the control member (24) while dampening vibrations between said core element (12) and the control member (24), said abrasion resistant member (28) including a tubular sleeve (48) extending axially along and about said core element (12) and a head (50) extending radially from said sleeve (48) for engaging said slug (20), said vibration isolating member (30) being softer than said abrasion resistant member (28), said connector (26) including an annular ring (36) extending annularly about said vibration isolating member (30), said vibration isolating member (30) including a neck (40) disposed in said ring (36); said sleeve (48) extending through said neck (40) of said vibration isolating member (30) and forcing said neck (40) of said vibration isolating member (30) radially outwardly into compressive engagement with said ring (36) of said connector (26).

5. An assembly as set forth in claim 4 wherein said vibration isolating member (30) includes an inner end (42) and an outer end (44) with a cylindric outer surface (46) extending therebetween, said neck (40) extending axially from said inner end (42).

6. An assembly as set forth in claim 5 wherein said head (50) extends radially from said sleeve (48) to abut said outer end (44) of said vibration isolating member (30).

7. An assembly as set forth in claim 6 wherein said head (50) presents a recess (52) surrounding said core element (12) for receiving said slug (20).

8. An assembly as set forth in claim 7 wherein said recess (52) is defined by a conical section of said head (50).

9. An assembly as set forth in claim 8 wherein said outer end (44) of said vibration isolating member (30) includes a conical recess (54) for receiving said conical section of said head (50).

10. An assembly as set forth in claim 7 wherein said head (50) includes a cup-shaped outer rim (56) surrounding said outer end (44) of said vibration isolating member (30).

11. An assembly as set forth in claim 6 wherein said inner end (42) of said vibration isolating member (30) presents a shoulder radially engaging said connector (26) about said neck (40).

12. An assembly as set forth in claim 11 wherein said connector (26) presents a cup-shaped flange (58) surrounding said inner end (42) of said vibration isolating member (30).

13. A motion-transmitting remote control assembly of the type for transmitting motion along a curved path by a flexible motion-transmitting core element, said assembly comprising:

a conduit (14);

a core element (12) having first and second ends;

a slug (20) secured to said first end of said core element (12);

a tubular sleeve (48) extending axially along and about said core element (12) and a head (50) extending radially from said sleeve (48) for engaging said slug (20); a connector (26) for connection to a control member (24) and including an annular ring (36); and a vibration isolating member (30) having an inner end (42) and an outer end (44) with an outer cylindrical surface (46) extending therebetween, said head (50) engaging said outer end (44), a neck (40) extending from said inner end (42) and into said ring (36), said sleeve (48) extending through said vibration isolating member (30) and forcing said neck (40) of said vibration isolating member (30) radially outwardly into compressive engagement with said ring (36).

14. An assembly as set forth in claim 13 wherein said head (50) presents a recess (52) surrounding said core element (12) for receiving said slug (20), said head (50) includes a cup-shaped outer rim (56) surrounding said outer end (44) of said vibration isolating member (30), said inner end (42) of said vibration isolating member (30) presents a shoulder radially engaging said connector (26) about said neck (40), said connector (26) presents a cup-shaped flange (58) surrounding said inner end (42) of said vibration isolating member (30), said cup-shaped flange (58) and said rim (56) being flared outwardly over and in spaced relationship to said outer cylindrical surface (46).

15. An assembly as set forth in claim 14 wherein said connector (26) includes a snap-in portion (32) extending from said cup-shaped flange (58) for insertion into and retention in the control member (24).

16. A method of fabricating a motion-transmitting remote control assembly of the type for transmitting motion along a curved path by a flexible motion-transmitting core element movably supported in a conduit with a slug secured to a first end of the core element and a terminal for transferring forces between the core element and a control member, wherein the terminal includes a connector for connection to the control member, an abrasion-resistant sleeve in sliding engagement with the core element and for abutting engagement with the slug, and a vibration isolating member supporting the abrasion-resistant sleeve within the connector to transmit forces from the slug to the sleeve and through the vibration isolating member and through the connector to the control member while dampening vibrations between the core element and the control member, said method comprising the steps of: fabricating the connector (26) with an annular ring (36), fabricating the vibration isolating member (30) with a neck (40) for disposition in the ring (36) and a central bore (62) extending through the neck (40), fabricating the sleeve (28) having an exterior larger than the bore (62) whereby the neck (40) of the vibration isolating member may be inserted into the ring (36) and the sleeve (28) thereafter inserted into the bore (62) to radially expand the neck (40) into gripping engagement with the ring (36) to retain the assembly together.

17. A method as set forth in claim 16 further defined as fabricating the bore within the neck of the vibration isolating member with a reduced cross-section (62) from the remainder (60) of the bore which is close in size to the exterior of the sleeve (28).

18. A method as set forth in claim 17 further defined as fabricating an inner end and an outer end (44) on the vibration isolating member (30) and with a conical recess (54) in the outer end (44), and fabricating the sleeve with a head (50) having a conical section for receiving the slug (20) and disposition in the conical recess (54) of the vibration isolating member (30).

19. A method as set forth in claim 18 further defined as fabricating the head (50) of the sleeve with a cup-shaped rim (56) flared outwardly from the outer end (44) of the vibration isolating member (30), and fabricating the connector with a flange (58) flared outwardly from the inner end (42) of the vibration isolating member (30).

\* \* \* \* \*